June 18, 1929. A. A. POLLOCK 1,717,852
LOAD REGULATION OF MECHANICALLY COUPLED MOTORS
Original Filed June 1, 1927
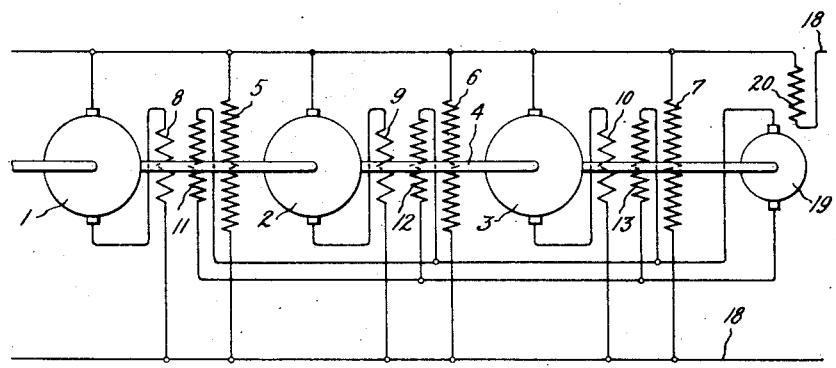
Inventor:
Alan A. Pollock
by
His Attorney Patented June 18, 1929.

1,717,852

UNITED STATES PATENT OFFICE.

ALAN A. POLLOCK, OF LEAMINGTON SPA, ENGLAND, ASSIGNOR TO GENERAL ELECTRIC COMPANY, A CORPORATION OF NEW YORK.

LOAD REGULATION OF MECHANICALLY-COUPLED MOTORS.

Application filed June 1, 1927, Serial No. 195,784, and in Great Britain June 22, 1926. Renewed September 28, 1928.

This invention relates to electric motors, and more particularly to motors adapted to be mechanically coupled together to drive a common load. It is well known that when motors are thus coupled, if the motors individually have flat speed-load characteristics they will not share the load equally nor run satisfactorily in parallel, whereas motors having drooping speed-load characteristics will share the load satisfactorily under similar conditions.

For some purposes it is desirable to have a flat speed-load characteristic as regards the total load and the object of the present invention is to provide means whereby each motor will have a drooping characteristic so far as its own load current is concerned, so as thereby to ensure satisfactory load sharing between the motors but a flat characteristic so far as the total combined load of all the motors is concerned.

In accordance with the invention each motor is provided with a shunt field winding, an accumulative series field winding, and a differential winding adapted to be separately excited from an exciter which is mechanically coupled to the motors and excited in accordance with the total current supplied to all the motors.

The drawing is a diagrammatic view showing a preferred form of the invention. In this arrangement the motor armatures 1, 2 and 3 are coupled by the shaft 4 and associated with these armatures respectively are the shunt windings 5, 6 and 7 and corresponding series windings 8, 9 and 10. The differential windings 11, 12 and 13, which are required to produce the flat speed-load characteristic, are separately excited from an exciter 19, which is mechanically coupled to the motors. The field winding 20 of the exciter 19 is connected to the supply lines 18, so that the excitation of the exciter 19 is provided by the total current supplied to all the motors, and the voltage of the exciter and consequently the ampere turns produced in the differential windings 11, 12 and 13 will be proportional to the line current and proportional, up to the point where saturation of the exciter field begins, to the average current taken by the motors. This arrangement only involves one small section lead between the motors and does not require any additional switches, and the motors start up as compound wound machines and therefore with improved starting torque. When the motors are at rest the exciter 19 is not running and therefore no voltage is produced across the differential windings 11, 12 and 13, and the motors accordingly start up as compound wound motors. As the motors increase in speed the exciter voltage builds up and the current in the differential windings gradually increases in value until the normal operating speed is reached, when the magnetomotive force of the differential windings 11, 12 and 13 would approximately equal that of the accumulative series windings 8, 9 and 10 respectively. For total load values beyond the predetermined value at which the exciter becomes saturated, the motors will have essentially accumulative compound characteristics.

Various characteristics may be obtained by adjusting the values of the differential windings, and by employing a mechanically interlocked rheostat connected in the fields 5 and 11, for example, it would be possible to obtain the same load-speed characteristic or different load-speed characteristics at different speeds, as desired.

By suitably arranging the saturation point of the exciter field to take place at a given main motor current, which is utilized to excite the exciter, it is possible to obtain a flat speed-load characteristic up to this given main current and on greater loads the motors would have drooping characteristics owing to the saturation of the exciter preventing proportional increase of the differential fields.

What I claim as new and desire to secure by Letters Patent of the United States, is:—

1. In combination, a plurality of mechanically coupled electric motors, a source of supply to which said motors are connected in parallel relation, each of said motors having a shunt field winding, an accumulative series field winding and a separately excited field winding differentially connected with respect to said series winding, and an exciter synchronously driven with said motors and connected to energize said differential windings, the said exciter being excited in accordance with the total current supplied to all the motors, whereby each motor will have a drooping characteristic as regards load sharing and a flat characteristic as regards total load.

2. In combination, a plurality of mechanically coupled electric motors, a source of supply to which said motors are connected in parallel relation, each of said motors having a shunt field winding, an accumlative series field winding and a separately excited field winding differentially connected with respect to said series winding, an exciter mechanically coupled with said motors for energizing said differential windings, the said exciter having only a series field winding energized in accordance with the total load current taken by said motors and constructed to become saturated at a predetermined value of said load current, whereby the motors start with the characteristic of accumulatively compound wound motors; as the normal operating speed is reached each motor will have a drooping characteristic as regards load sharing and a flat characteristic as regards the total load, and the motors will have an accumulative compound characteristic for load values beyond a predetermined load.

In witness whereof, I have hereunto set my hand this 13th day of May, 1927.

ALAN A. POLLOCK.